United States Patent [19]
Beppu et al.

[11] Patent Number: 5,757,632
[45] Date of Patent: May 26, 1998

[54] SWITCHED CAPACITANCE VOLTAGE MULTIPLIER

[75] Inventors: Takemi Beppu; Hiroshi Matsui, both of Gunma, Japan

[73] Assignee: Sanyo Electric Co., Ltd., Osaka, Japan

[21] Appl. No.: 799,868

[22] Filed: Feb. 14, 1997

[30] Foreign Application Priority Data

Feb. 29, 1996 [JP] Japan ..................... 8-043673
Feb. 29, 1996 [JP] Japan ..................... 8-043674

[51] Int. Cl.$^6$ ........................................ H02M 3/07
[52] U.S. Cl. ........................................ 363/60; 363/59
[58] Field of Search ...................... 363/59, 600; 327/536

[56] References Cited

U.S. PATENT DOCUMENTS

| | | | |
|---|---|---|---|
| 3,631,259 | 12/1971 | Kiyota | 363/60 |
| 4,769,753 | 9/1988 | Knudson et al. | 363/60 |
| 5,451,858 | 9/1995 | Van Duyne et al. | 323/281 |
| 5,463,542 | 10/1995 | Okamoto | 363/60 |
| 5,481,447 | 1/1996 | Caris et al. | 363/60 |
| 5,491,623 | 2/1996 | Jansen | 363/60 |
| 5,606,491 | 2/1997 | Ellis | 363/59 |
| 5,635,776 | 6/1997 | Imi | 363/60 |

FOREIGN PATENT DOCUMENTS

| | | | |
|---|---|---|---|
| 0297844 | 1/1989 | European Pat. Off. | H02M 3/07 |
| 0558339 | 9/1993 | European Pat. Off. | H02M 3/07 |
| 5244766 | 9/1993 | Japan | H02M 3/07 |

Primary Examiner—Jeffrey L. Sterrett
Attorney, Agent, or Firm—Loeb & Loeb LLP

[57] ABSTRACT

A saw-wave generator (51) creates a saw-wave. Two comparators (COMP1, C0MP2) obtain two control signals having different duty ratios. Using these two control signals, two transistors (54, 56) are switched ON and OFF in complement and at voltage boost output when transistor (54) is OFF and transistor (56) is ON, transistor (57) is switched from ON to OFF and transistor (59) is switched from ON to OFF. A quadrupled voltage is thereby obtained.

13 Claims, 7 Drawing Sheets

PRIOR ART

SWITCHED CAPACITANCE VOLTAGE MULTIPLIER

BACKGROUND OF THE INVENTION

1. Field of the Invention

The present invention relates to a charge pump circuit using a capacitor for boosting voltage and in particular to a charge pump circuit in which switch control can be easily carried out.

2. Description of the Prior Art

A charge pump circuit using a capacitor and a switch for boosting voltage such as that disclosed in Japanese Patent Laid-Open Publication No. Hei 5-244766 is well known.

FIG. 1 is a circuit diagram depicting the charge pump circuit, in which a power voltage (+Vcc) is applied to terminal (10). Capacitors C1 and C2 are charged by this power voltage. Charge and discharge of capacitors C1 and C2 is controlled by opening and closing switches S1, S2, S3 and S4 in compliance with control signals PA and PD. Control signals PA and PD are generated by a control circuit (14) consisting of an oscillator (16), a divider (20) and inverters (18) and (22).

FIGS. 2(A), 2(B), 2(C) and 2(D) depict open and closed states of switches S1, S2, S3 and S4. Here, the switches are closed at "H" and open at "L".

At time t1, switches S1, S2, S3 and S4 are in the open-close states as depicted in the diagram. Capacitor C1 is here charged with power voltage (+Vcc) from terminal (10). Capacitor C2 has already been charged 1 cycle earlier with +2Vcc.

Next, switches S1, S2, S3 and S4 are in the open-close states depicted at time t2. The sum of the recharging voltages of capacitor C1 and C2 here produces a voltage of +3Vcc on the plus side of capacitor C2.

Furthermore, switches S1, S2, S3 and S4 are next in the open-close states depicted at time t3. The voltage on the plus side of capacitor C1 is now +2Vcc. Capacitor C2 is therefore charged to +2Vcc.

Next, switches S1, S2, S3 and S4 are in the open-close states depicted at time t4. The voltage on the plus side of capacitor C2 is now +4Vcc and the voltage on the plus side of capacitor C0 changes to +4Vcc.

As a result, the plus and minus side voltages of capacitor C1 have the state shown at FIG. 2(E), the plus and minus side voltages of capacitor C2 have the state shown at FIG. 2(F) and the plus side voltage of capacitor C0 is as shown at FIG. 2(G).

Power voltage (+Vcc) can therefore be multiplied by a factor of 4 using the circuit in FIG. 1.

However, the circuit in FIG. 1 has the disadvantage that the open-close operation of switches S1, S2, S3 and S4 is complicated. In the FIG. 1 circuit, the control signals (PA, PB) applied to capacitor C1 are at half the frequency of the control signals (PC, PD) applied to capacitor C2 as shown at FIGS. 2(A)-2(D) and therefore the open-close operation of switches S3 and S4 must be performed twice for each operation of switches S1 and S2. Consequently, not only is the switching operation complicated, but there is the added problem that the control circuit (14) shown in FIG. 1 also requires an oscillator (16) and a divider (20) which necessitates a large increase in the number of elements.

There has therefore been a demand for a device capable of easily controlling the switches which control capacitor charge-discharge when power voltage (+Vcc) is multiplied by 4.

SUMMARY OF THE INVENTION

It is therefore the object of the present invention to provided a charge pump requiring a reduced number of switching operations.

It is also the object of the present invention to provide a charge pump capable of carrying out control with a small number of elements.

Furthermore, it is also the object of the present invention to provide a charge pump with high voltage boosting efficiency.

A charge pump of the present invention has at least 2 capacitors. After connecting the + side of a first capacitor to a power source and recharging this capacitor, a voltage twice the voltage of the power source is obtained by connecting the − side to the power source. Using the next capacitor in the same manner, the voltage obtained from the first capacitor is doubled to obtain a voltage which is 4 times the voltage of the power source.

In order to achieve these objectives, a charge pump of the present invention comprises a first capacitor wherein one electrode is connected to a voltage source via a rectifying member and the other electrode is connected to a reference potential via a first switch and also to the voltage source via a second switch;

a second capacitor wherein one electrode is connected to one of the electrodes of the first capacitor via a rectifying member and the other electrode is connected to a reference potential via a third switch and also to the electrode of the first capacitor via a fourth switch; and a control circuit for repeatedly alternating in complement between ON and OFF at designated cycles of the first and second switches thereby controlling charge/discharge of the first capacitor and repeatedly alternating in complement between ON and OFF at designated cycles of the third and fourth switches thereby controlling charge/discharge of the second capacitor.

When the second switch is OFF, the third and fourth switches maintain a fixed state; and when the second switch is ON, the third and fourth switches switch ON and OFF in complement.

As a result, it is no longer necessary for the ON/OFF cycle of the third and fourth switches to be greater than the ON/OFF cycle of the first and second switches. The switching operation is therefore reduced and can be controlled with a small number of elements.

In addition, the charge pump could have a saw-wave generator for creating control signals to control switching of the switches and two comparators for comparing an output signal from the saw-wave generator with first and second reference voltages. With this configuration, an oscillator with a high frequency and a divider and such like are not required and the number of elements can be reduced.

Furthermore, switches 1-4 consist of transistors 1-4. A first and/or second current supply circuit for supplying a base current to the second and/or the fourth transistor should preferably be provided. A sufficient base current can thus be supplied and VCE (the voltage between collector and emitter) can be reduced when the second and/or the fourth transistor turns ON. Boosting efficiency can thereby be increased.

Furthermore, a designated bias should preferably be supplied to the base current of the second and/or the fourth transistor by a resistance connected to the voltage source.

DESCRIPTION OF THE PREFERRED EMBODIMENTS

Embodiment 1

Figure 1:
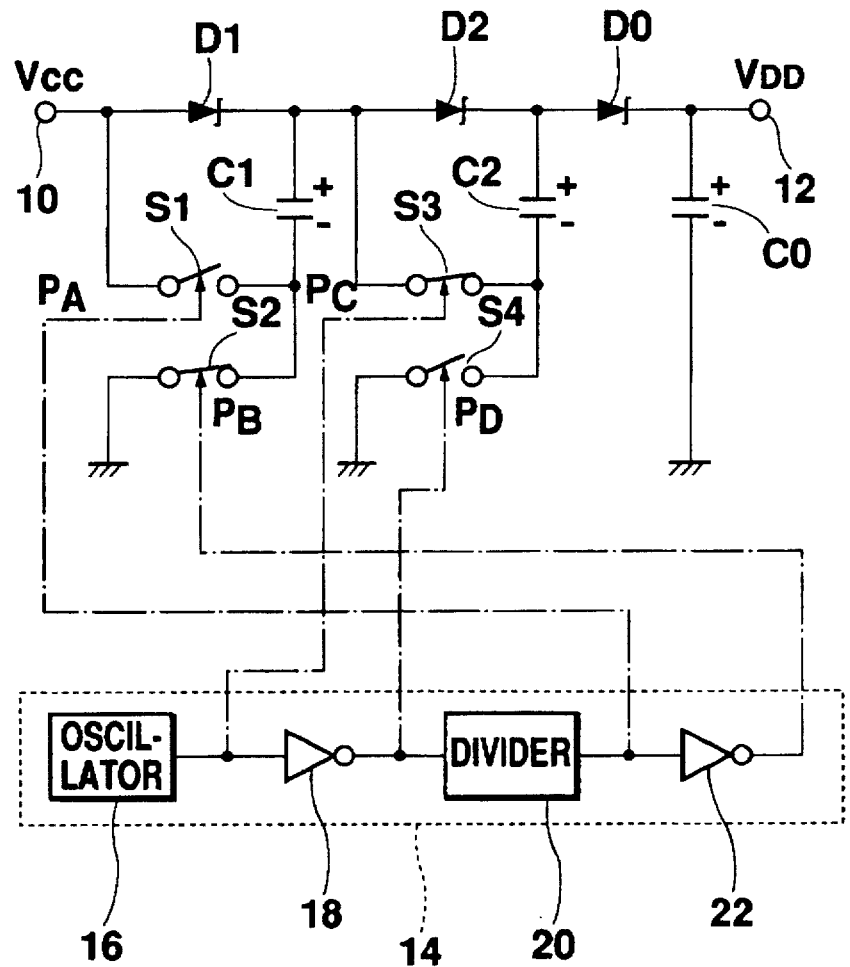
FIG. 1 is a circuit diagram showing a conventional charge pump.
Figure 2:
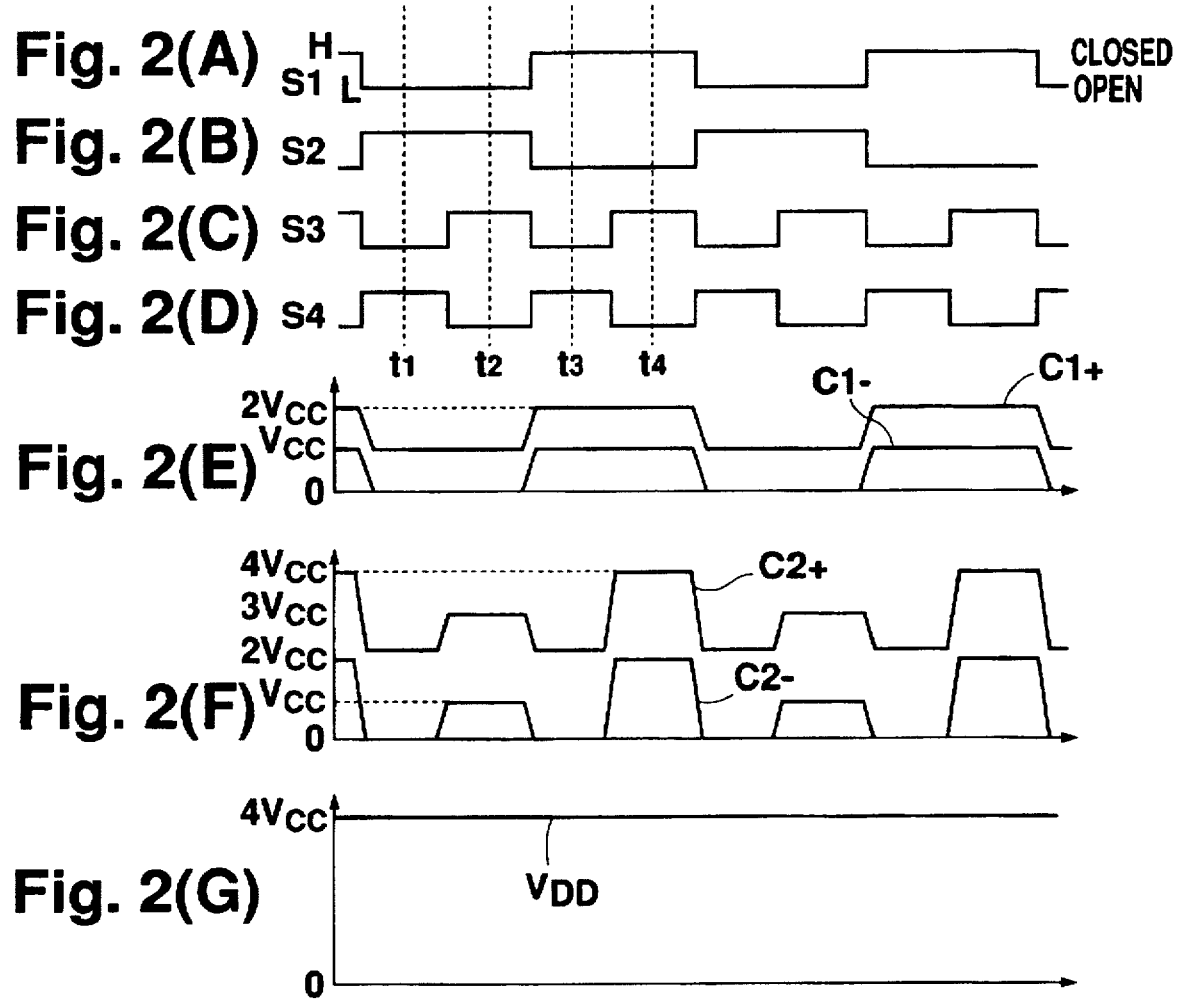
FIGS. 2(A), 2(B), 2(C), 2(D), 2(E), 2(F), 2(G) depict waveforms explaining properties of a conventional charge pump.
Figure 3:
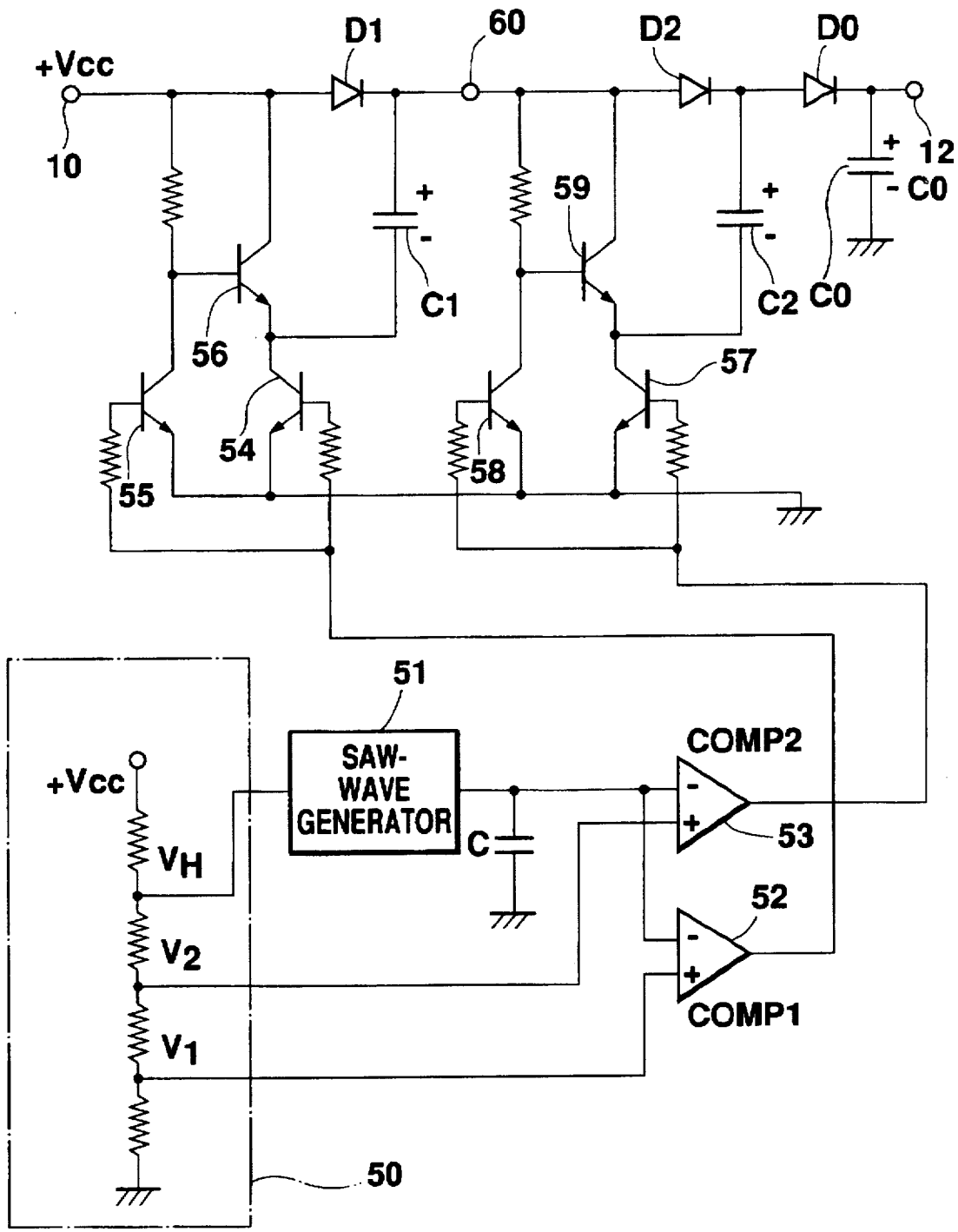
FIG. 3 is a circuit diagram showing the configuration of a first embodiment of the present invention.
Figure 4:
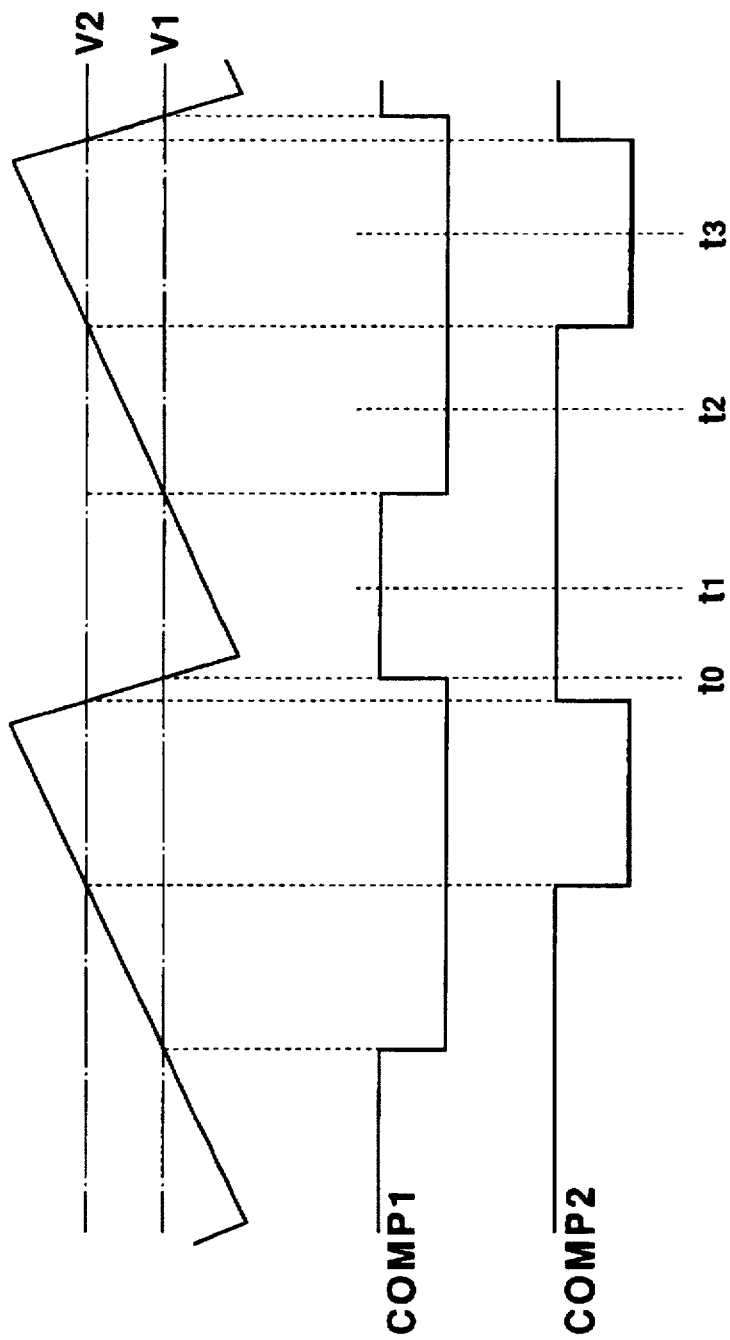
FIGS. 4(a), 4(b), 4(c) depict waveforms explaining properties of the first embodiment.

FIG. 3 shows a charge pump circuit of a first embodiment of the present invention, in which (50) is a reference voltage generator for splitting a power voltage using resistance and generating three voltages VH, V2 and V1, (51) is a saw-wave generator for generating a saw-wave as shown by the line in FIG. 4(a) by controlling the application of voltage VH to capacitor C, (52) is a first comparator for comparing the level of voltage V1 with the level of a saw-wave outputted from the saw-wave generator (51) and generating a control signal as shown in FIG. 4(b), (53) is a second comparator for comparing the level of voltage V2 with the level of a saw-wave outputted from the saw-wave generator (51) and generating a control signal as shown in FIG. 4(c), (54) is a transistor for switching ON in compliance with a control signal from the first comparator (52) and connecting the − side of capacitor C1 to a ground, (55) and (56) are transistors operating in compliance with a control signal outputted from the first comparator (52) and connecting the − side of capacitor C1 to a power supply, (57) is a transistor for switching ON in compliance with a control signal outputted from the second comparator (53) and connecting the − side of capacitor C2 to a ground, (58) and (59) are transistors for operating in compliance with a control signal outputted from second comparator (53) and connecting the − side of capacitor C2 to a power supply.

Voltage Vcc is applied at terminal 10 which is connected to the + electrode of capacitor C1 by a diode D1. In addition, the collector and emitter of transistor 56 are connected to terminal 10 and to the − electrode of capacitor C1 respectively. Furthermore, the collector and emitter of transistor 54 are connected to the − electrode of capacitor C1 and to a reference potential (earth) respectively. The base of transistor 56 is connected to terminal 10 with a designated resistance. The collector of transistor 55 is connected to this transistor 56 base and the emitter of transistor 55 is connected to a reference potential (earth). Bases of transistors 54 and 55 are connected to the output of comparator COMP1.

The + electrode of capacitor C2 is connected to the + electrode of capacitor C1 by diode D2. In addition, the collector of transistor 59 is connected to the + electrode of capacitor C2 and the emitter of transistor 59 is connected to the − electrode of capacitor C2. Furthermore, the collector and emitter of transistor 57 are connected to the − electrode of capacitor C2 and to a reference potential (earth) respectively. The base of transistor 59 is connected to the + electrode of capacitor C1 by a designated resistance. The collector of transistor 58 is connected to the transistor 59 base and the emitter of transistor 58 is connected to a reference potential (earth). Bases of transistors 57 and 58 are connected to the output of comparator COMP2.

The + electrode of capacitor C0 is connected to the + electrode of capacitor C2 by diode D0 and the − electrode of capacitor C0 is connected to a reference potential (earth). Furthermore, the + electrode of capacitor C0 is connected to output terminal 12.

Saw-wave generator (51) outputs a saw-wave as depicted in FIG. 4(a) using voltage VH from reference voltage generator (50). In other words, the saw-wave is generated by controlling the charge and discharge currents to capacitor C. Two voltages V1 and V2 are then set in compliance with the amplitude of the wave and the waveforms shown in FIGS. 4(b) and 4(c) are created by comparing the saw-wave with voltages V1 and V2 at comparators COMP1 and COMP2 respectively. The FIGS. 4(b) 4(c) waveforms have the same frequency but different duty ratios. Assuming that operation commences at time t, the FIGS. 4(b) 4(c) signals both commence at the H level (H=charging of capacitors C1 and C2) but FIG. 4(b) falls to the L level (L=discharging of capacitor C1) first, followed by FIG. 4(c) (L=discharging of capacitor C2).

Figure 5:
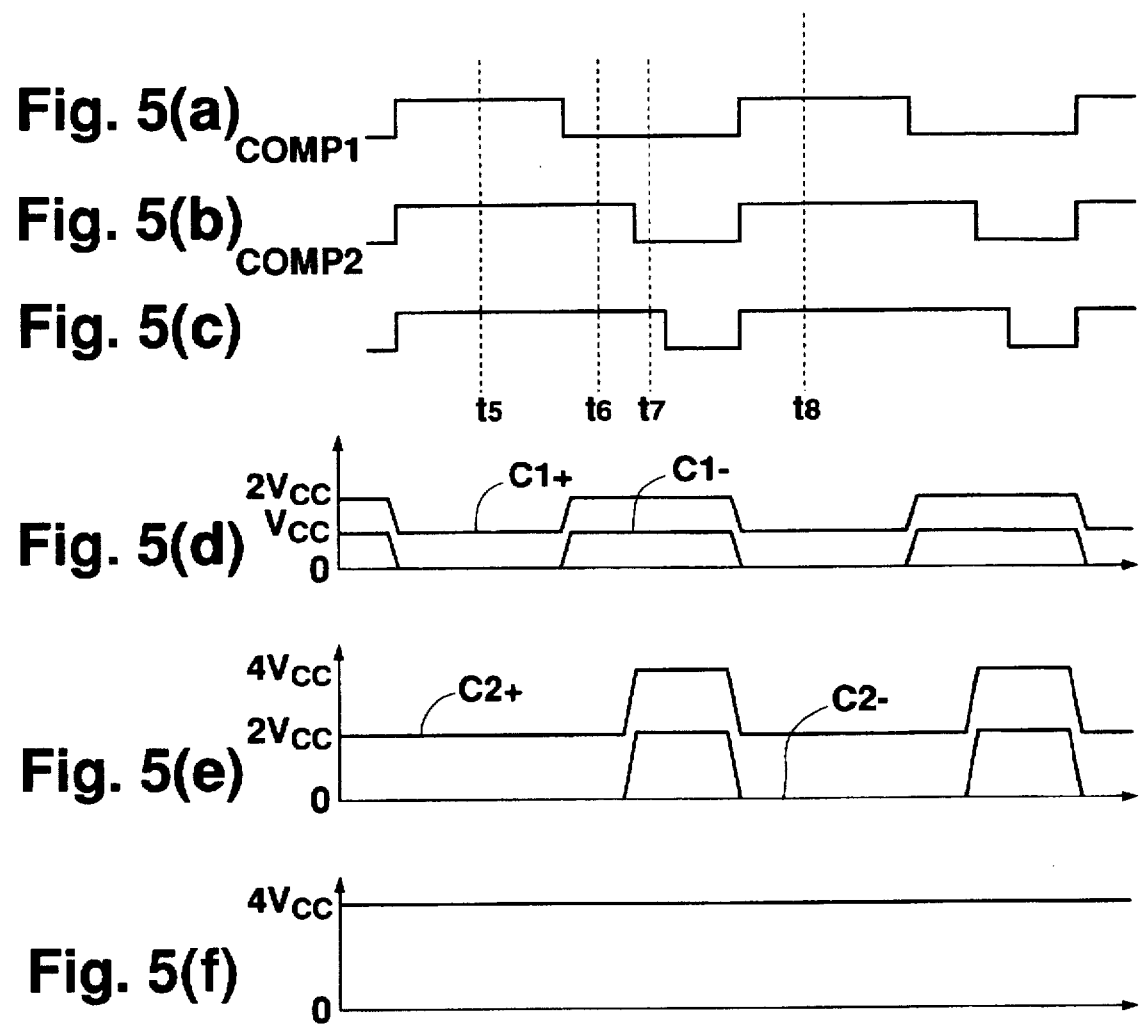
FIGS. 5(a), 5(b), 5(c), 5(d), 5(e), 5(f) depict waveforms explaining properties of the first embodiment.

In other words, the FIGS. 4(b) 4(c) signals have the same frequency but different duty ratios. FIGS. 5(a) and 5(b) show condensed versions of the FIGS. 4(b) 4(c) signals. The charge/discharge operation of capacitors C0, C1 and C2 will next be explained using FIGS. 5(a)–5(e).

Firstly, at time t5 the FIGS. 4(b) 4(c) signals are both at the H level (H=charging of capacitors). Transistors (54) and (57) are consequently ON. In addition, transistors (55) and (58) switch ON and transistors (56) and (59) switch OFF. As a result, a current in compliance with the power supply from terminal (10) flows through diode D1, capacitor C1 and the first transistor (54).

Similarly, a current in compliance with the power supply from terminal (10) flows through diode D2, capacitor C2 and the fourth transistor (57). As a result, the power voltage (+Vcc) is charged to the capacitors C1 and C2.

When the control signal of the first comparator (52) changes to the L level at time t6, transistors (54) and (55) switch OFF and transistor (56) switches ON. The voltage on the minus side of capacitor C1 is then +VCC and the voltage on the plus side is +2VCC. Capacitor C2 is now charged (transistor (59) is OFF and transistors (57) (58) are ON) with a voltage of +2VCC.

Next, when the control signal of the second comparator (53) also falls to the L level at time t7, the fourth transistor (57) switches OFF and the sixth transistor (59) switches ON. The voltage on the minus side of capacitor C2 therefore becomes +2VCC and the voltage on the plus side becomes +4VCC.

A +4VCC voltage is thus charged to capacitor C0. When the operation reaches time t8, the charge voltage of capacitor C1 is +VCC and the charge voltage of capacitor C2 is +2VCC. Consequently, when the operation returns to an initial state identical to that at time 5, voltage at the plus side of capacitor C1 is +VCC and voltage at the plus side of capacitor C2 is +2VCC. FIG. 5(d) shows capacitor C1 plus and minus side voltages. FIG. 5(e) shows capacitor C2 plus and minus side voltages. The plus side voltage of capacitor C0 thus becomes +4VCC as FIG. 5(f) shows.

Embodiment 2

Figure 6:
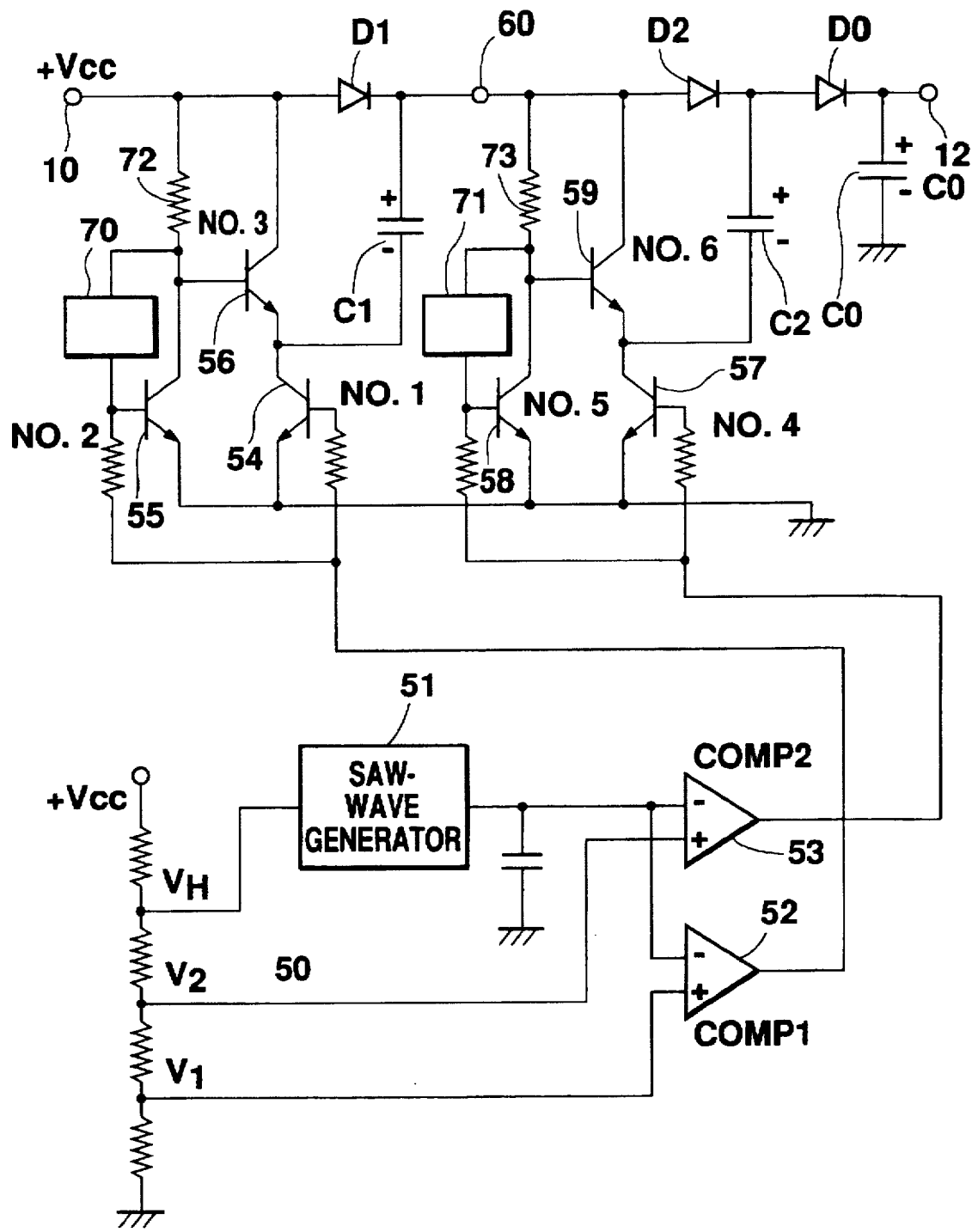
FIG. 6 is a circuit diagram showing the configuration of a second embodiment of the present invention.

FIG. 6 depicts a configuration of a second embodiment. This example includes a first current supply circuit (70) for supplying a base current to transistor (56) in compliance with a control signal outputted from a first comparator (52) and a second current supply circuit (71) for supplying a base current to transistor (59) in compliance with a control signal outputted from a second comparator (53).

Problems arise when the value of the resistance (72) providing a bias to the third transistor (56) in FIG. 6 is too great or too small. For instance, if the resistance value is too small, a large current flows through when transistor (55) has switched ON causing an increase in power consumption. Conversely, if the resistance value is too high, the required base current will not flow to the third transistor (56) when the second transistor (55) has switched OFF. As a consequence of this, the third transistor (56) will not be able to switch completely ON and the VCE (the voltage between collector and emitter) of the third transistor (56) will increase. When the VCE of the third transistor (56) increases, the voltage outputted after boosting will be reduced by that amount (the VCE) thereby adversely affecting boosting efficiency.

Therefore, in the second embodiment, a first current supply circuit (70) is provided separately to supply a base current to the third transistor (56). The third transistor (56) can thus switch ON completely and VCE is kept as low as possible.

Supplying the base current to the third transistor (56) from a first current supply circuit (70) has the same effect as reducing the value of the resistance (72). As a result, it is now possible to raise resistance (72) to a relatively high value without affecting the ability of the third transistor (56) to switch ON completely and there is no increase in power consumption.

Figure 7:
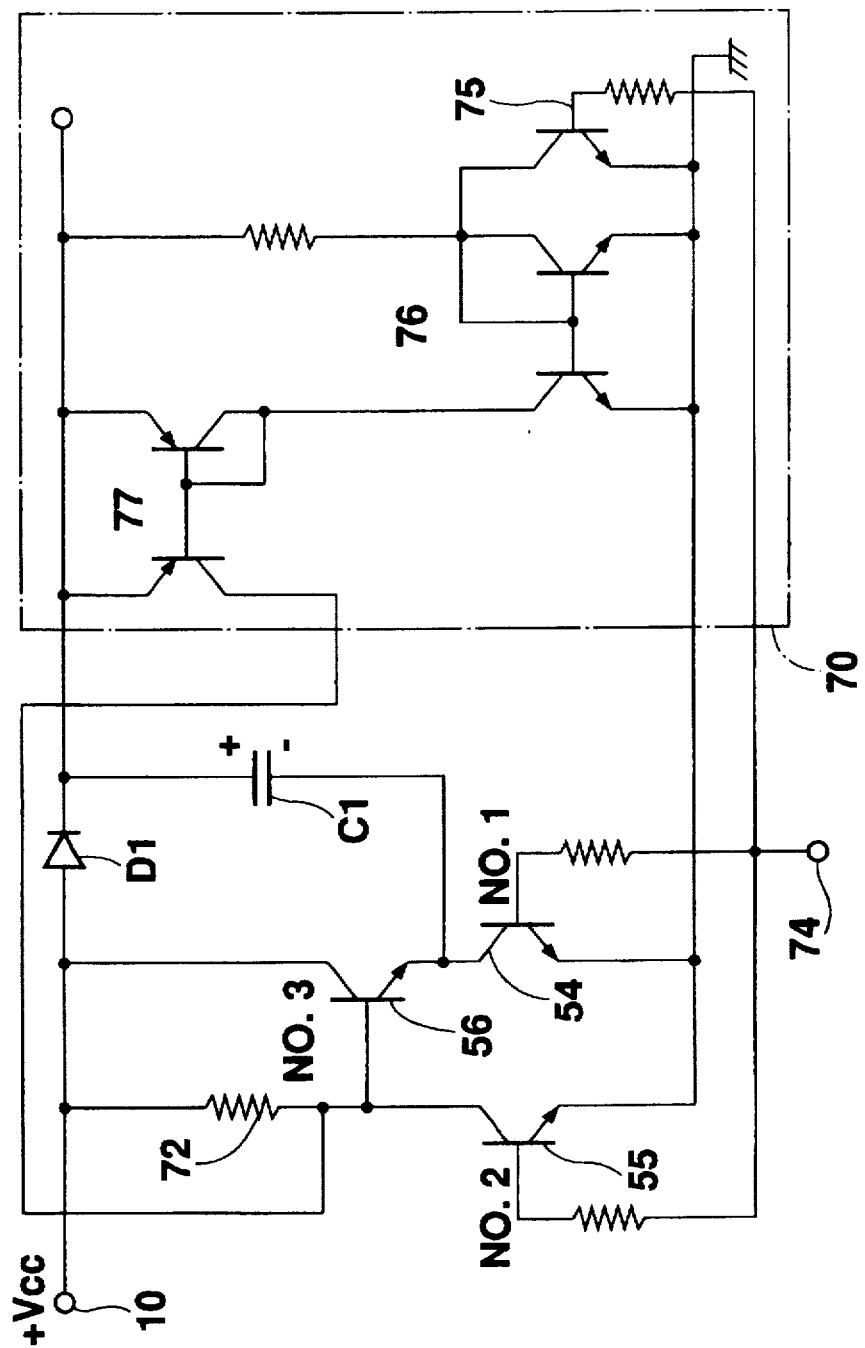
FIG. 7 is a circuit diagram showing a configuration example of a current supply circuit of the second embodiment.

FIG. 7 shows a concrete example of a first current supply circuit (70) in which a control signal from the first comparator (52) in FIG. 6 is applied to a terminal (74). If terminal (74) is now outputting at the H level, the second transistor (55) switches ON. Since the transistor (75) contained within the first current supply circuit (70) switches ON, current mirrors (76) and (77) become inoperative. Consequently, power voltage is added to the resistance (72) and the problem of excessive power consumption can be avoided by setting resistance (72) at a high value.

Next, if terminal (74) is outputting at the L level, the second transistor (55) switches OFF. Since the transistor (75) contained within the first current supply circuit (70) switches OFF, the current mirrors (76) and (77) become operative. As a result, current from the resistance (72) and current from current mirror (77) are supplied as base to transistor (56). Current here is sufficient since most of the base current of transistor (56) is supplied from current mirror (77). Transistor (56) can thus be switched ON completely and VCE can be kept at low as possible.

The second current supply circuit (71) is identical in configuration and operation to the first current supply circuit (70) and supplies a base current to the second transistor (59).

What is claimed is:

1. A charge pump for boosting power voltage from a voltage source, comprising a first capacitor wherein one electrode is connected to a voltage source via a rectifying member and the other electrode is connected to a reference potential via a first switch and also to the voltage source via a second switch;

a second capacitor wherein one electrode is connected to one of the electrodes of the first capacitor via a rectifying member and the other electrode is connected to said reference potential via a third switch and also to the one electrode of the first capacitor via a fourth switch, and a control circuit for repeatedly alternating in complement between ON and OFF at designated cycles of the first and second switches thereby controlling charge/discharge of the first capacitor and repeatedly alternating in complement between ON and OFF at designated cycles of the third and fourth switches thereby controlling charge/discharge of the second capacitor; wherein the control circuit outputs a first control signal for switching the first and second switches ON and OFF in complement and a second control signal for switching the third and fourth switches ON and OFF in complement:

when the second switch is OFF, the third and fourth switches maintain a fixed state;

when the second switch is ON, the third and fourth switches switch ON and OFF in complement;

when the first switch is ON and the second switch is OFF, the third switch maintains ON and the fourth switch maintains OFF in accordance with the second control signal;

when the first switch is OFF and the second switch in ON, the third switch is changed from ON to OFF and the fourth switch is changed from OFF to ON;

the control circuit comprises a saw-tooth wave generator and a comparator for comparing an output signal from the saw-tooth wave generator with designated and mutually differing reference voltages; and the comparator generates a first control signal for controlling the ON/OFF states of the first and second switches and controlling charge/discharge of the first capacitor and a second control signal for controlling the ON/OFF states of the third and fourth switches and controlling charge/discharge of the second capacitor.

2. A charge pump according to claim 1, wherein the first control signal and second control signal have identical frequency and different duty ratios.

3. A charge pump according to claim 1, wherein the comparator consists of a first comparator for comparing output of the saw-tooth wave generator with a first one of the reference voltages and a second comparator for comparing output of the saw-tooth wave generator with a second one of the reference voltages.

4. A charge pump according to claim 3, wherein the first and second reference voltages are created by resistance-dividing the power voltage of the voltage source.

5. A charge pump according to claim 1, wherein the first, second, third and fourth switches consist of first, second, third and fourth transistors respectively, and switching is carried out by altering the ON/OFF states respectively, of these transistors.

6. A charge pump according to claim 5, further comprising:

a fifth transistor for connecting the base of the second transistor to said reference potential; and a resistance for connecting the base of the second transistor to a voltage source; wherein the first control signal is supplied to the base of the fifth transistor.

7. A charge pump according to claim 5, wherein the first and second transistors are of identical type, one of the two receives the first control signal and the other transistor receives a control signal corresponding to an inverted form of the first control signal; and the third and fourth transistors are of identical type, one of the two receives the second control signal and the other transistor receives a control signal corresponding to an inverted form of the second control signal.

8. A charge pump according to claim 7, wherein the first and second control signals are supplied unaltered to the first and third transistors and control signals corresponding to the inverted forms of the first and second control signals are supplied to the second and fourth transistors, respectively.

9. A charge pump according to claim 5, further comprising a first base current supply circuit for supplying base current to the second transistor in compliance with the first control signal.

10. A charge pump according to claim 9, wherein the first base current supply circuit comprises a transistor which turns ON/OFF in compliance with the first control signal; and
in compliance with the ON/OFF state of this transistor, the first base current supply circuit supplies a base current to the second transistor.

11. A charge pump according to claim 9, further comprising
a second resistance, one end of which is connected to the voltage source and the other end of which is connected to the fourth transistor, for providing a bias to the fourth transistor.

12. A charge pump according to claim 9, further comprising
a second base current supply circuit for supplying base current to the fourth transistor in compliance with the second control signal.

13. A charge pump according to claim 9, further comprising
a first resistance, one end of which is connected to the voltage source and the other end of which is connected to the second transistor, for providing a bias to the second transistor.

* * * * *